Figure 1:
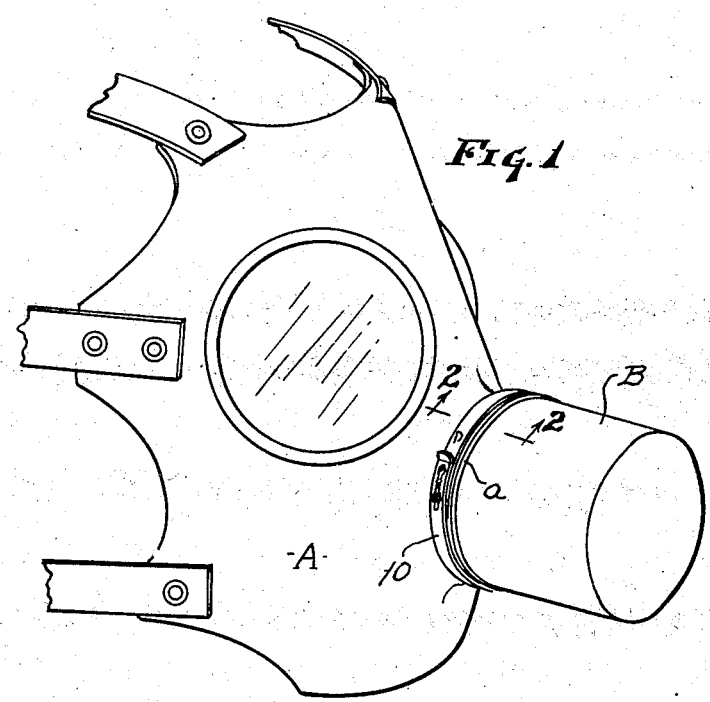

May 11, 1943.   G. A. TINNERMAN   2,318,816
FASTENING DEVICE
Filed June 27, 1942   3 Sheets-Sheet 1

INVENTOR.
George A. Tinnerman,
BY Balin, Jean & McBean,
Attorneys.

May 11, 1943.  G. A. TINNERMAN  2,318,816
FASTENING DEVICE
Filed June 27, 1942  3 Sheets-Sheet 2

INVENTOR.
George A. Tinnerman
BY
Bates, Teare & McBean
Attorneys.

May 11, 1943.   G. A. TINNERMAN   2,318,816
FASTENING DEVICE
Filed June 27, 1942   3 Sheets-Sheet 3

INVENTOR.
George A. Tinnerman,
BY
Bates, Teare McBean,
Attorneys.

Patented May 11, 1943

2,318,816

UNITED STATES PATENT OFFICE 2,318,816

FASTENING DEVICE

George A. Tinnerman, Cleveland, Ohio, assignor to Tinnerman Products, Inc., Cleveland, Ohio, a corporation of Ohio Application June 27, 1942, Serial No. 448,741

18 Claims. (Cl. 24—296)

This invention relates to a fastening device which is adapted for embracing an object and for holding a second object in predetermined position with relation to the first. One such application for usage is in the retention of a flexible material in superposed or contiguous position with respect to a rigid article, such for example, as in a hose clamp or in a gas mask, where a flexible tube surrounds and is clamped to a metal tubular member.

As applied to gas mask, considerable difficulty has been experienced in obtaining a gas tight seal between the flexible mask material and the rigid container for the filtering material, the speaking valve, or other appliances customarily found in such devices. Difficulty comes about because of the fact that the flexible member has a tendency to buckle, when being constricted about the rigid surface and to form small puckers which have necessitated considerable time to smooth out before the clamping could be finally accomplished.

Where the parts are clamped together by means of a wire, for example, which is wrapped around the flexible material and then twisted, the force clamping the parts together is not distributed uniformly around the periphery thereof. The wire tends to press more firmly at the region of the twist and to cut into the material. It also makes a joint which is not relatively permanent, but is subject to fracture or dislocation due to the rough handling of the device.

Where, for example, a customary hose clamp is employed, with a bolt and nut utilized for drawing the ends together, the pressure is again distributed non-uniformly, the tendency upon tightening of the bolt being to cause an elliptical or egg-shaped formation which will bind tightly in the intermediate region, but which will result in a bulge of the fabric in the region of the bolt and in the diametrically opposite region of the clamp.

An object of the present invention is to provide a fastening device which when used as a hose clamp, or for retaining any two articles together in embracing relationship, results in the pressure being distributed uniformly throughout the entire periphery. Another object is to provide a clamp which may be quickly assembled without the need of extraneous fastening members and will remain in assembled position indefinitely while constantly exerting a clamping pressure.

There is a tendency for flexible material which contains rubber, to stretch and, hence, to effect a loosening of a clamping connection; accordingly, an additional object of the present invention is to provide a device which may be tightened from time to time progressively so as to maintain a more complete seal without requiring additional attaching devices in connection therewith.

An important feature of the present invention is the fact that the fastener may be moved to a temporary clamping position for positioning over the part to be clamped, so as to permit smoothing out of the material to be clamped and facilitating the handling thereof prior to the final clamping operation.

Other objects of the invention pertain to the details of construction whereby more rigid assembly is effected, and whereby the application of clamping pressure between the cooperating ends of the fastener is more readily obtained, and whereby the final shape of the fastener in clamping position is one which conforms in a complementary manner to the shape of the article being clamped.

Figure 2:
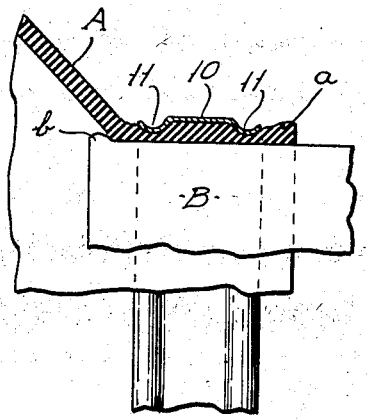
Figure 3:
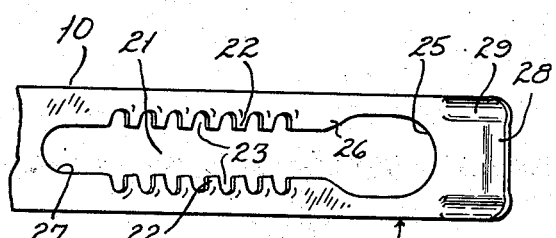
Figure 4:
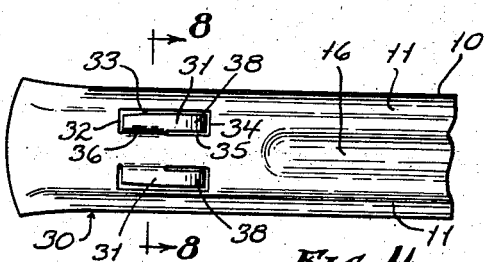
Figure 5:
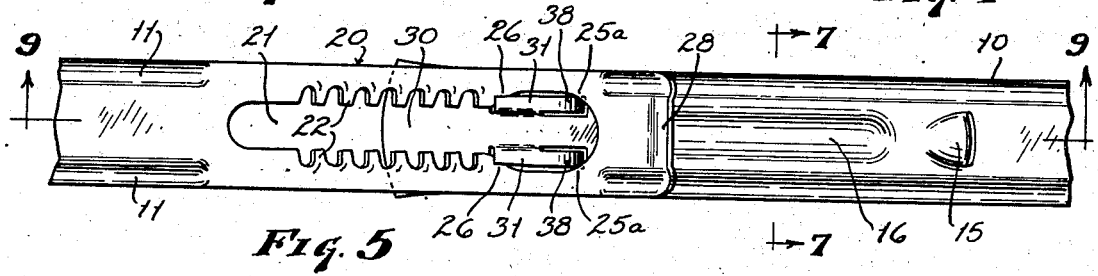
Figure 6:
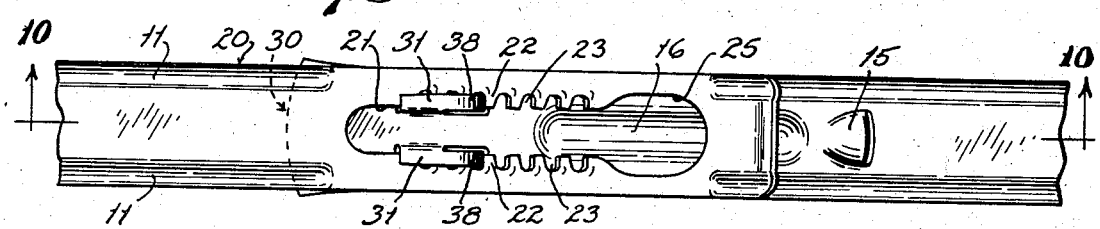
Figure 7:
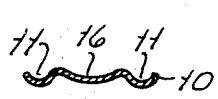
Figure 8:
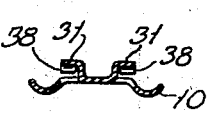

Referring now to the drawings: in Sheet 1, Fig. 1 is a perspective view of one type of device with which a fastener embodying the present invention is used, the device being illustrated as a conventional form of gas mask; Fig. 2 is a section taken on the line 2—2 in Fig. 1; Fig. 3 is a top plan view of a portion of one end of the fastener on an enlarged scale from that shown in Fig. 1; Fig. 4 is a top plan view of the opposite end of the fastener; Fig. 5 is a plan illustrating the two ends brought together into what is termed temporary position; Fig. 6 is a plan showing the same two ends of the fastener in locking position; Fig. 7 is a cross section of the fastener band, being taken on the line 7—7 in Fig. 5; Fig. 8 is a cross section of the band on the line 8—8 in Fig. 4.

Figure 9:
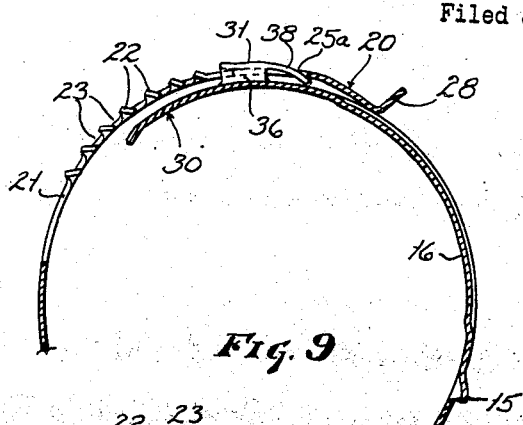
Figure 10:
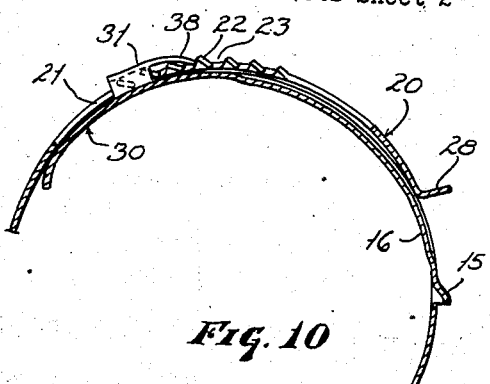
Figure 11:
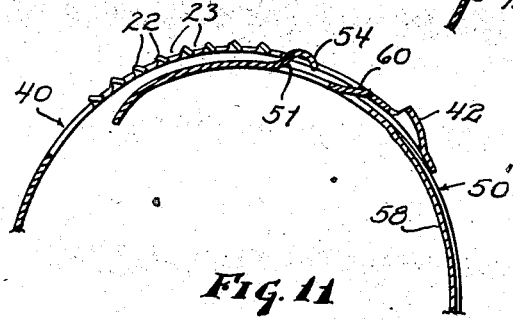
Figure 12:
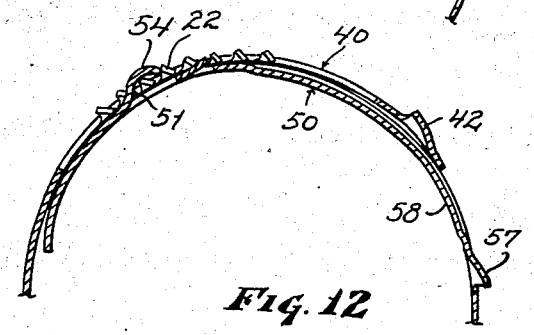
Figure 13:
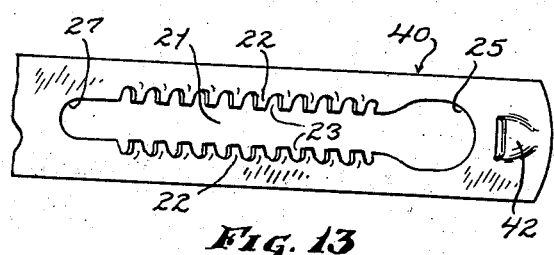
Figure 14:
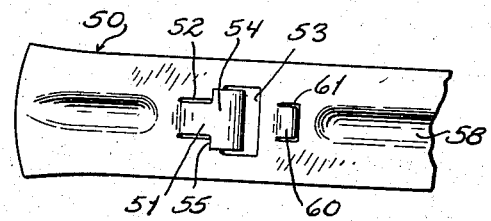
Figure 15:
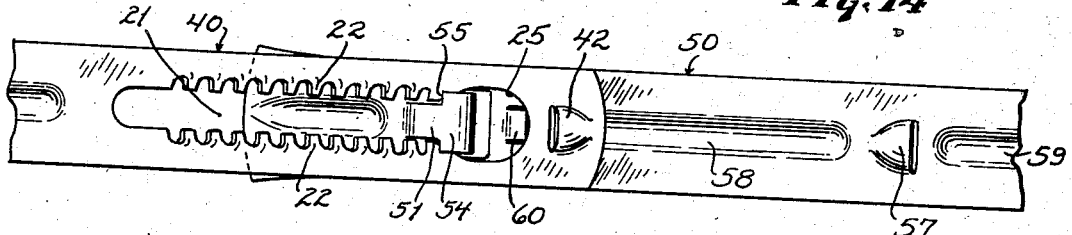
Figure 16:
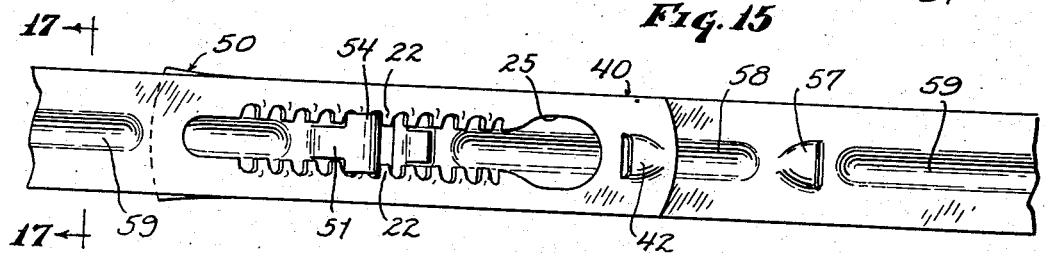
Figure 17:
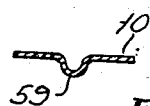

Fig. 9 in Sheet 2 is an arcuate section taken on the line 9—9 in Fig. 5; Fig. 10 is a section taken on the line 10—10 in Fig. 6; Figs. 11 to 17 inclusive, show a modified form of construction, wherein Fig. 11 is an arcuate section showing the parts in temporary position; Fig. 12 is a section similar to Fig. 11 but showing the same portions in clamping position; Fig. 13 is a top plan view showing one end portion of this form of fastener; Fig. 14 is a top plan view showing the opposite end portion of the fastener; Fig. 15 is a top plan view showing the fastener portions of Figs. 13 and 14 in temporary clamping position; Fig. 16 is a top plan view showing the same fastener in locking position; Fig. 17 is a cross section taken, for instance, on the line 17—17 in Fig. 16.

Figure 18:
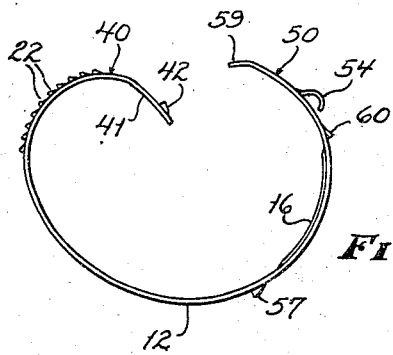
Figures 23, 24:
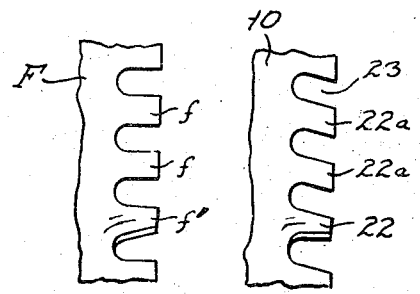
Figure 19:
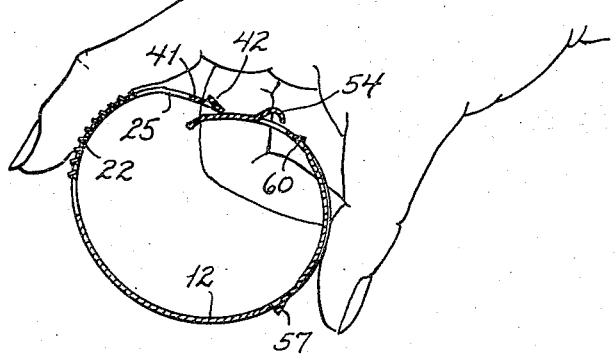
Figure 22:
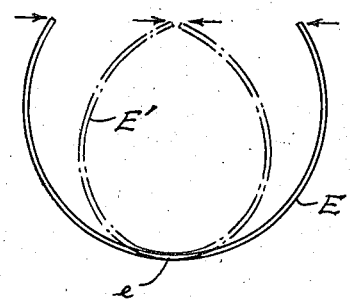

Fig. 18, in Sheet 3, is an end view showing the shape of the fastener of either embodiment after its complete manufacture but previous to its assembly; Fig. 19 is a view similar to Fig. 18, but illustrating the preliminary step in effecting the assembly operation so as to bring the ends of the fastener into temporary position shown in Fig. 20; Fig. 21 illustrates the means for moving the end portions into clamping position; Fig. 22 is a diagrammatic view illustrating the effect of uneven distribution of forces at the time of clamping, if the shape of the fastener should be made truly circular in its initial form; Fig. 23 is a diagrammatic view showing a blank form with interdental spaces wherein one of the teeth is tipped upwardly and illustrates the inclined surface which would be presented to the end of the pawl for clamping; Fig. 24 is a view similar to Fig. 23, but shows the improved manner of forming the teeth, so as to obtain an abutting surface at right angles to the plane of the slot through which the retaining pawl passes.

In Figs. 1 and 2, A indicates conventionally a rubber gas mask and B an accompanying can containing filtering or alexipharmic material. The rubber mask has an opening about which the material of the mask forms, or may be stretched to form, an annular flange a snugly embracing the metallic can B, the latter being preferably formed with a small bead b adjacent its free end for retention purposes. The rubber flange a is embraced and clamped on the metallic tubular member B by my clamp, one form of which appears at 10 in Figs. 1 and 2. This clamp is a metallic strip having its end portions provided with means hereinafter described for holding them adjustably but tightly together about the rubber flange. The edge portions of the strip may be bent to present longitudinal beads 11 which bear into the rubber sleeve.

Referring now to Figs. 3 to 10 inclusive, the clamp is a continuous integral strip of sheet metal and may be conveniently referred to as having an intermediate portion and two end portions. One of these end portions designated 20 is formed with a longitudinal opening 21 in opposite sides of which are teeth 22 formed by lateral interdental enlargements 23 of the main opening 21. Near the end of the strip the opening 21 is enlarged at 25 so that its transverse dimension is substantially the same as the distance between the closed ends of opposite interdental spaces. Beyond the teeth, in the direction toward the intermediate region of the strip, the opening 21 continues of smaller width as shown at 27.

The teeth 22 are twisted on an axis transverse of the strip in a manner to raise that edge of the tooth which is distant from the end of the strip, leaving the top of the tooth inclined from the edge nearest the end of the strip gradually upwardly to the far edge where it has an abrupt descent into the next interdental space. The purpose of this construction is to provide ratchet teeth with which one or more pawls on the other end of the strip may coact successively, as about to be described.

I will next refer to Fig. 4, which shows the other end portion 30 of the strip. This portion carries in this embodiment a pair of pawls 31 formed from the body of the strip and bent upwardly therefrom, and of such position and dimensions that they can readily enter the opening 25 when the end portion 30 is placed beneath the portion 20, and then extend upwardly into that opening and thereafter contact with the ratchet teeth 22 as the strip is gradually closed about the member to be clamped.

In the manufacture of the fastener, the pawls 31 are formed first as flat tongues by making slits through the body of the strip. These slits form three sides and part of a fourth side of a rectangle. That is to say, each slit has a short transverse portion 32 (Fig. 4), then a long portion 33, then a short transverse portion 34, then a longitudinal portion 35 of approximately half the length of the reach 33. This leaves the cut-out tongue 31 connected to the body of the strip at 36 in a region aligned with the short longitudinal slit 35. The tongue is then bent upwardly at this connecting region 36 and then substantially parallel with the top plane of the strip for the region adjoining the connecting neck 36, and then, adjacent its free end, the tongue is bent downwardly toward the body of the strip, as indicated at 38.

The wide portions 25 of the slot 21 in the strip has a length nearly as great as that of the tongues 31 so that if the end portion 30 carrying the tongues is placed under the end portion 20 having the slot, the tongues may readily pass upwardly into the slot until they lie above the plane of the end portion 20 as shown in Figs. 5 and 9. Then if the two end portions are shoved together the tongues 31 will ride over the teeth 22, the inwardly bent ends 38 of the tongues being cammed upwardly by the ratchet faces of successive teeth 22 across which they pass. Whenever the applied collapsing pressure is relieved, upon the band becoming tight about the sleeve to be clamped, the tongue ends 38 will remain in the last interdental openings 23 they have occupied and thus retain the two ends clamped together in locked position. This is illustrated in Figs. 6 and 10.

The band may readily be collapsed, manually, sufficiently to cause the pawls 31 to enter the enlarged portion 25 of the slot and their leading ends to overlie the body of the strip at 26 at the reduced portion of the slot, as illustrated in Figs. 5 and 9. At this time the curved ends 38 of the tongues project downwardly through the slot 25 and their longitudinal edges engage the arcuate wall of the slot, as at 25a. The tongues thus comprise a detent which prevents the band from expanding and a temporary condition is obtained which allows the band to be placed over the parts to be joined and in position for the application of a tool to effect the final closing.

After the band has been temporarily closed and then located in its proper place in the assembly the collapsing may be completed by a suitable tool engaging the two end portions of the band and causing the slotted portion to slip over the pawl-carrying portion.

A suitable tool for closing the clamp described is illustrated at C, Fig. 21 (though shown in conjunction with a modified form of clamp hereinafter described). This tool comprises a pair of mutually pivoted jaws similar to an ordinary pair of pinchers. The end portion 20 of the strip is formed with an outward projection which may be the bent up end 28, and another projection 15 is formed on the other end portion but well back of the pawls 31 and the tool engaging these two projections, as indicated in Fig. 21, may readily collapse the band to make it embrace the clamping sleeve with the desired snugness.

The bent up end 28 of the strip may be braced by indentations 29 in the strip, as indicated in Fig. 3. Likewise, the strip may be stiffened in front of the raised projection 15 by a longitudinal distortion or depression 16 as indicated in Figs. 5 and 7, for instance. This longitudinal projection is useful in preventing outward bending of the strip in the region between the jaws of the applying tool in case the two projections 28, 15 are a considerable distance apart when the tool acts.

To free the collapsed band from its engaged position a slight pressure may be applied by the tool C to the lugs 28 and 15 collapsing the band slightly further and relieving the pressure on the pawl tongues, and then the tongues may be tipped up free from the teeth they engaged by a suitable tool similar to an awl or screw driver, as indicated at D, Fig. 21.

I will now describe the construction illustrated in Figs. 11 to 17 inclusive, which show a somewhat modified form of band, but one operating on the same general principle as already described. The description and reference characters, heretofore employed relating to the opening and ratchet teeth in one end portion of the strip, apply equally well to this modification. The pawl portion is constructed differently from that heretofore described, though it has the same feature of providing two spaced shoulders to coact with the two sets of ratchet teeth.

In these views, I have designated as 40 the end portion of the strip carrying the ratchet teeth and as 50 the end portion carrying the pawl. In this embodiment, I use only one pawl instead of two as heretofore described. The single pawl is designated 51. In the manufacture of the strip the pawl is first formed as a flat tongue by reason of slits 52 in the body of the strip, the slits forming first a narrow tongue portion and then, by bounding a wider rectangular open space 53, provide a wider head 54 on the tongue.

The narrow shank of the tongue 51 is bent diagonally upward from the plane of the strip as shown in Figs. 11 and 12 and the head 54 of the tongue is curved over to project downwardly at the free end, as shown in these figures. The extreme end of this head 54 is a short distance above the top plane of the strip, while the shoulders 55, where the wide head joins the shank are a greater distance above the plane of the strip.

It results from the formation described that if the slotted portion 40 of the strip is overlapped on the pawl-carrying portion 50, the pawl 51 may pass freely upwardly through the opening 25, with the shoulders 55 above the plane of the portion 40, but with the extreme end of the head below that plane, as indicated in Figs. 11 and 15. Accordingly, when the parts are in the position shown in these views, and the band thereafter, collapsed, the projecting portion of the pawl head slides over the ratchet teeth, the laterally overhanging portions of the head engaging the inclined faces of the teeth, and drops into successive interdental spaces. The pawl thus finally rests with its end engaging the transverse edges of opposed teeth as shown in Fig. 12.

The operation of mounting the band about the sleeve to be clamped is the same as in the embodiment heretofore described. The band is collapsed manually to a temporary position later described and then is placed manually about the sleeve and collapsed by such a tool as shown at C in Fig. 21. As indicated in Figs. 11 to 21 the outward lug on the slotted end portion 40 of the band is formed by making a transverse slit in the flat region between the opening 25 and the adjacent end of the band and forming an upward distortion beyond it, indicated at 42, and thus providing one abrupt shoulder for engagement by the closing tool. The other abrupt shoulder 57 is made similarly on the other portion of the band but faces in the opposite direction. The band in front of the shoulder 57 is preferably stiffened by a longitudinal trough 58 to prevent outward bowing of the band during application, as heretofore described in connection with the other embodiment.

In the embodiment of Figs. 11 to 17, I have shown a single trough-shaped depression 59 extending centrally along the band in place of the two edge depressions 16 in the first embodiment. It is to be understood that either the two edge depressions or the central depression may be employed with either pawl arrangement, or such depressions may be omitted altogether and the band made flat in cross section throughout its intermediate region. The latter formation is simpler and has been found satisfactory for clamps for use about sleeves of comparatively small diameter.

It is desirable to have means for holding the band temporarily in such closed position as it may receive manually before the tight clamping is effected by the tool. All that is necessary for this purpose is a suitable shoulder on the pawl-carrying portion of the band adapted to engage the end of the opening 25 in the other portion. Such projection is indicated at 60 in Figs. 11, 14 and 15 and comprises a tongue partially severed from the band by a U-shaped slit 61, the tongue being then bent up at an acute angle to the band and projecting in the same general direction as the pawl.

In originally mounting the band being described, the pawl is passed through the opening 25 and the overlapped end portions of the band shoved together manually, merely until the lug 60 enters the opening 25, which position brings the shoulders 55 of the pawl over the face of the end portion 40 of the band. The resilience of the band holds it in this temporary position as shown in Figs. 11 and 15.

The temporary holding of itself in a closed position is quite an advantage as it enables the band to be collapsed manually about the sleeve to be retained and held in that position for adjustment of the sleeve after which the tool may set the band in its final clamping position. The temporary holding feature also enables the band to be retained in a closed but non-clamping form as indicated for instance in Fig. 20, so that the band in such condition may readily be slipped endwise over the sleeve to be clamped. This does not require the spreading of the band to the same extent as where it is moved laterally across the diameter of the sleeve.

I prefer to manufacture the fastener band with an initial curvature of such form that when the band is collapsed about a sleeve of the appropriate size, the band will naturally assume a substantially circular form and cause substantially equal pressure all around the sleeve. In Fig. 22, I have indicated at E a band which is a segment of a true circle. Now, when the open ends of such a band are brought together to make an enclosing ring, the band tends to flex in the region indicated at e, midway between the ends of the band, and the band tends to assume the approximate elliptical or egg-shaped form indicated by the broken lines E' in this figure.

To avoid the uneven action referred to, I form my band of substantially the shape of a script C, as shown in Fig. 18. Inasmuch as the central region at 12 is to be flexed to the greatest degree, as per Fig. 22, I form it with a relatively large radius, considerably in excess of that of the intended final arc illustrated in Fig. 21. As regions farther and farther from the mid-portion are to flex to a progressively slighter degree, the radius of curvature is preferably reduced gradually and to a corresponding degree until the end regions are reached.

As the locking engagement is to take place somewhere along the series of teeth 22 it will be apparent that there will be only an imperceptible, if any, amount of bending in this region, the forces being mainly in tension along the band. Thus the radius in this region is very nearly that of the final configuration; in fact it is preferred to have it substantially smaller inasmuch as this end portion 40 is to overlie the other end and will be expended thereby. The extreme end region 41 is tipped inwardly so as to contact the underlying band with sufficient pressure to prevent inadvertent engagement with foreign objects.

For reasons similar to the above, the region near the pawl 51 is to be mostly in tension and hence will not be flexed by the collapsing of the band. However, since this end of the band is to be embraced by the other end, as mentioned above, the radius is preferably slightly greater than that of the final form. The extreme tip, at 59, is bent inward slightly to avoid interference with the underside of the teeth as the band is collapsed.

Figure 20:
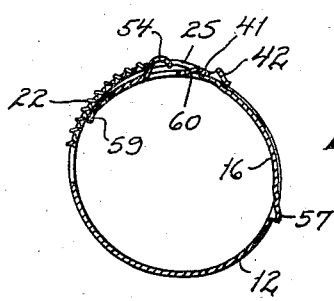
Figure 21:
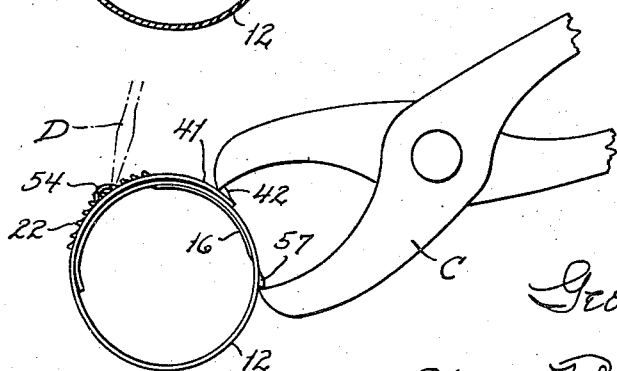

It will be noted, in Fig. 20, that by the time the band has been collapsed, or wound up, to temporary position, all the regions have assumed very nearly the same curvature, and that upon further closing, as by the tool C in Fig. 21, a still closer approach to a true circle is obtained. This close approach is maintained throughout the range provided by the series of teeth 22.

An important feature of the fastener of this invention is the inherent stiffness of the material, a highly tempered spring steel being preferable, whereby the band assumes its final shape solely by reason of its own configuration and properties and not by a mere drawing tight about an object to be fastened. Thus the material, such as rubber, which is being clamped about a rigid article is not allowed to pucker. All regions of the material remain in their normal position and are compressed uniformly, in contrast to the creeping which is produced when a more or less ductile band is drawn around them and then secured. This latter action almost invariably produces a pucker, and hence a poor seal, at the securing region.

When a fastening band, which has the form shown in Fig. 18, is placed about a cylindrical sleeve it may be readily collapsed manually by pressure exerted approximately on its greatest diameter while lifting the end 41 until it passes over the end 59, as shown in Fig. 19. Then as the pressure continues the end of the toothed portion slides along on top of the pawl-carrying portion and over the inclined shank of the pawl and beyond the pawl. This brings first the pawl head and then the lug 60 into the opening 25. Then if the manual pressure is relieved, the band will be retained in the form shown in Fig. 20 by reason of the lug 60 engaging the end of the opening 25.

In the temporary position shown in Fig. 20 the pawl stands with its shoulders just above the ratchet faces of the first ratchet teeth. Now if the band is further collapsed the pawl head slides over the ratchet teeth one after the other and eventually comes to rest with the two laterally projecting portions of the head engaging the interdental spaces selected. As heretofore mentioned, and as will be seen from Fig. 20, the extreme end of the pawl is lower than the tops of the ratchet faces; accordingly, during the collapsing the pawl will be cammed outwardly as each tooth is passed and spring back into the space beyond such tooth. Thus whenever the collapsing pressure stops, the band remains in that position.

If the tool C, Fig. 21, is applied to the lugs 42 and 57 of the manually placed band of Fig. 20, such tool may readily bring the band into such locking position as indicated for instance in Fig. 21, though this clamped condition may take any position within the range of the several ratchet teeth, the pawl engaging the first ratchet tooth or the last tooth or any intermediate tooth as desired.

In order to make the abrupt faces of the teeth which the pawl engages stand at right angles to the length of the band, I cut the teeth originally, in the manufacture of the band before the teeth are twisted, so that they extend from the remaining blank in a direction inclining away from the opening 25. It results from this preliminary formation that when the distant edges of these teeth are tipped upwardly such edges will project substantially at right angles to the length of the band.

The original formation of the teeth is illustrated in Fig. 24, wherein the teeth 22a in their first flat form before twisting will be shown as inclining away from the right angle form, whereas when the tooth is twisted as shown at 22 to make an inclined top and an abrupt forward edge, the latter is at substantially right angles to the length of the strip.

On the other hand, Fig. 23 indicates what the condition would be if the teeth were originally at right angles to the strip. In that figure, I have indicated at F such theoretical strip having right angle flat teeth f as an original formation, and at f' the tooth after being twisted to present the inclined ratchet top. In such case the locking edge of the tooth would be inclined, so that the pawl tooth would not obtain as good a hold and would tend to slip.

My clamping band, either in the form illustrated in Figs. 3 to 10 or the form of Figs 11 to 21, has the characteristic of being a single unitary strap provided adjacent one end with an opening having ratchet teeth on its opposite edges with interdental spaces, and on the other end provided with raised shoulders which are adapted to be passed through the opening in the first mentioned end to lie above that end in position to coact with teeth as the band is collapsed and become locked to the teeth selected. Such a clamping band, with its provision for automatically locking its ends together in various positions, has a wide range of utility, and the disclosure of the same applied to a gas mask should be taken merely as an illustration of one of such uses.

While I have illustrated two forms embodying my invention, each of which has been found useful in practice, it should be noted that modifications in the construction of the band, specifically different from either form shown, may be made without departing from my invention, and I do not intend to limit myself to specifications, further than the prior art and the appended claims require.

I claim:

1. A fastening device comprising a strip of material adapted to extend around the parts to be joined, one end portion of the strip having a slot with an enlargement adjacent the end of the strip and the other end portion having a pawl formed to extend through the enlargement and thereafter overhang the face of that portion of the strip back of the enlargement.

2. A fastening device comprising a strip of material adapted to extend around the parts to be joined, one end portion of the strip having a narrow slot with an enlargement adjacent the end of the strip, teeth on the opposite edges of the slot where it is narrower than the enlargement and the other end portion having a pawl means formed to extend through the enlargement and thereafter overhang the face of the strip on opposite sides of the narrower portion of the slot and engage said teeth.

3. A fastener adapted to embrace members to be joined, said fastener comprising a strip of spring metal having an opening in one end portion and means on the other end portion adapted to engage the end of the opening for temporarily holding the strip closed consequent upon the telescoping of the ends thereof, and a pawl on the latter end portion adapted to engage a tooth at the edge of an extension of the opening for holding the strip in a more contracted position.

4. A fastener comprising a strip of spring metal provided at one end portion with a shoulder and at the other end portion with a recess to receive the shoulder and hold the fastener in temporary closed position, and a plurality of interdental spaces on one end portion and a pawl on the other end portion adapted to coact successively with said spaces consequent upon the collapsing of the fastener in any one of several collapsed positions.

5. A fastener comprising a strip of spring metal having a slot through one end portion, teeth formed on the fastener on opposite sides of the slot with interdental spaces between them, said slot being formed at its end adjacent the end of its strip into an opening of wider extent than the distance between the opposite teeth, and the other end of the strap being provided with pawl means adapted to extend through the enlarged opening when that end of the strip underlies the first mentioned end, said pawl means thereafter successively engaging different ratchet teeth and springing into the interdental spaces beyond them as the band is telescopically collapsed.

6. A fastening device comprising a strip of spring metal adapted to be bent into an embracing band, one end portion of the strip being provided with teeth and the other end portion with a coacting pawl, said teeth in the formation of the strap lying in the plane thereof and extending obliquely thereto and being thereafter twisted to present inclined tops and shoulders which are at substantially right angles to the length of the strip.

7. A fastening device in the form of a strip of spring metal having normally a form approximately corresponding to a letter C formed with various radii so that when collapsed it will assume a substantially true circle about a cylindrical part to be clamped, the two end portions of the strip being provided with shoulders adapted to interlock by telescopic action as the strip is closed.

8. A fastening device comprising a strip of spring metal normally of a form approximately corresponding to a letter C with the intermediate portion approximately a semi-oval and one end portion substantially a circular arc of smaller radius, and the other end portion flatter than the intermediate portion, so that when collapsed with the first end portion extending over the second end portion the fastener will become substantially a true circle about a cylindrical part to be clamped, the first mentioned end portion of the strip being provided with a series of teeth and the second end portion with a shoulder adapted to interlock therewith by telescopic action as the fastener is closed.

9. A fastening strip provided on one end portion with a set of teeth and on the other end portion with pawl means adapted to coact with any of the teeth, the intermediate portion of the fastener between the two end portions mentioned being formed of larger radius than the end portion carrying the teeth, and there being a projecting end beyond the teeth, and on the other end portion a projecting end beyond the pawl means, said two projecting ends being normally spaced from each other and the end adjacent the teeth extending inwardly of the loop so as to require it to be bent outwardly when the fastener is collapsed and thus obtain a spring action against the other end portion.

10. A fastening device comprising a sheet metal strip having a shoulder adjacent one end, the other end portion having a projecting lug some distance back from that end, the latter portion having a stiffening longitudinal distortion between the lug and that end of the strip, and means on the respective portions of the strip adapted to coact automatically to retain the strip closed when said shoulder and lug are forced toward each other.

11. A fastener comprising a strap of spring sheet metal having a longitudinal opening through one end portion with teeth formed on opposite sides of the opening and projecting laterally toward it and interdental spaces between the teeth joining the opening, the opening being enlarged between the teeth and that end of the strip, the other end portion being provided with a pair of integral pawls cut from the body of the strip and bent upwardly to pass through the enlargement of the opening when the pawl carrying end lies beneath the slot end and thereafter to pass over the teeth as the fastener is collapsed, the rear ends of said pawls being free to move and normally projecting downwardly from the forward portion of said pawls to spring into interdental spaces as the pawls pass over the teeth in collapsing the fastener.

12. A fastener comprising a strap of spring sheet metal having a longitudinal opening through one end portion with teeth formed on opposite sides of the opening and projecting laterally toward it and interdental spaces between the teeth joining the opening, the opening being enlarged between the teeth and that end of the strip, the other end portion being provided with a pawl cut from the body of the strip, said pawl having a neck which is inclined at an acute angle to the strap and a projecting head at the end of the neck wider than the neck and bent downwardly at the free end toward that end of the fastener, said pawl being adapted to pass through the enlargement of the opening when the pawl carrying end lies beneath the slot end and thereafter to pass over the teeth as the fastener is collapsed, and a tongue behind said pawl adapted to extend into the opening and engage the end edge thereof for retaining the fastener in temporary position.

13. A fastening device comprising a strip of material having a slot through it adjacent one end and a shoulder adjacent the other end of the strip, said slot having a lateral enlargement, said shoulder being adapted to occupy the slot and having an overhanging head which may be passed upwardly through said enlargement and engage the upper face of the other portion of the fastener, and teeth at the edge of the slot which extend upwardly about the surface of the slotted strip, whereby said head may extend downwardly into any of the interdental spaces.

14. A fastening device comprising a strip having a slot through it adjacent one end portion, teeth formed in the wall of the material on opposite sides of the slot, said teeth being twisted to incline upwardly to present ratchet faces, the other end portion of the strip being provided with pawl means adapted to ride successively on the upper face of said teeth while the body of said end portion of the strip underlies the portion carrying the slot.

15. A fastening device comprising a strip of spring metal having a slot through it adjacent one end portion, teeth formed in the wall of the metal on opposite sides of the slot, said teeth being twisted to incline upwardly to present ratchet faces substantially parallel with each other, the other end of the strip being provided with pawl means adapted to ride on the upper face of the first mentioned portion of the strip and successively engage said teeth which the pawl means overhangs, the said slot having a lateral enlargement through which the overhanging portion of the pawl means may be passed from the underside of the strip to the upper side thereof.

16. A fastening device comprising a strip of spring metal having a slot through one end portion with teeth on opposite walls of the slot projecting out of the plane of the strip and a pawl on the other end portion adapted to enter the slot and overhang the strip at each side thereof and coact with the teeth on both sides of the slot and selectively engage any of several pairs of teeth on opposite sides of the slot.

17. In a fastening device, a strip having at one end portion a slot with teeth on its opposite edges projecting out of the plane of the strip, said slot being widened beyond the teeth, the other end portion having two pawls adapted to be passed through the widened part of the slot, one pawl thereafter engaging the teeth on one side of the slot the other the teeth on the other side.

18. In a fastening device, a strip having at one end portion a slot with teeth on its opposite edges projecting out of the plane of the strip, the other end portion having a pawl with a laterally extended rigid head adapted to engage teeth on the opposite sides of the slot.

GEORGE A. TINNERMAN.